BINAURAL SOUND SYSTEM FOR TELEVISION RECEIVERS

Filed Nov. 27, 1957 2 Sheets-Sheet 1

INVENTORS
HENRY S. KATZENSTEIN
BENJAMIN PARZEN
BY Darby & Darby.
ATTORNEYS

INVENTORS
HENRY S. KATZENSTEIN
BENJAMIN PARZEN
BY Darby & Darby
ATTORNEYS

United States Patent Office
3,056,854
Patented Oct. 2, 1962

3,056,854

BINAURAL SOUND SYSTEM FOR TELEVISION RECEIVERS

Henry S. Katzenstein, Englewood, N.J., and Benjamin Parzen, Woodside, N.Y., assignors to Unitronics Corporation, Long Island City, N.Y., a corporation of New York Filed Nov. 27, 1957, Ser. No. 699,315
14 Claims. (Cl. 178—5.8)

The present invention relates to simulated binaural sound systems, and more particularly systems of this type which may be incorporated in a television receiver and controlled by a received television signal.

Many schemes have been proposed to heighten the impact or realism of television presentations. Color television is a representative example of attempts to provide more realistic television presentations. Although color unquestionably enhances the entertainment value of television programs, the technical difficulties encountered in color television have been so great that the purchase and maintenance of color sets is quite expensive.

The present invention presents a new approach to increasing the entertainment value of television broadcast which eliminates many difficulties of such complex systems as color television. The present invention provides a binaural effect in the sound system of the television receiver which greatly increases the illusion of actual presence of the television performer before the viewer. The effectiveness of binaural sound depends upon the fact that the audience of a moving picture, television, or radio program is able to sense to a considerable degree the direction of the sound which they hear. In a monaural system, the sound source is stationary although the other senses or previous experience indicates that the sound source should move in accordance with the action portrayed. This departure from reality and experience tends to defeat the attempted illusion, and lessens the realism or real presence of the presentation.

However, by providing more than one sound source and causing the sound produced at each source to differ, an illusion of three-dimensional sound can be achieved comparable to the familiar visual three-dimensional illusion of stereoscopic apparatus.

The most straightforward method of achieving a binaural effect is to provide two separate and independent sound channels to two loud speakers separated by several feet. The sound signals may originate, for example, from similarly spaced microphones in a sound studio. This system obviously requires duplication of the ordinary monaural sound system from its origin to its termination. It also requires in the case of a radio or television broadcast twice the frequency bandwidth for the broadcast of the two binaural channels.

A true binaural system employing two separate sound channels can be considerably simplified and yet retain the binaural illusion. This can be done by employing only a single sound channel and switching this sound channel from one to the other of two separate speakers in response to a simple two-condition signal. If desired, rather than switching completely from one speaker to the other speaker, the sound signal may be fed to the respective speakers in a variable proportion so that the total sound output of the two speakers is kept constant but the percentage of the sound signal emanating from a given speaker may be continuously controlled from 0% to 100% of the total sound.

It will be observed that the simplified system does not require two complete sound channels but only a single sound channel plus a control signal which may be transmitted within a very limited frequency bandwidth. However, even the simplified system explained above requires that a control signal for controlling the apparent sound direction be generated and transmitted to the receiver.

The present invention provides a simulated binaural sound system for a television receiver which requires additional apparatus at the receiving station only, and utilizes only the picture portion of the television signal to control the apparent sound direction so that it will generally correspond to the sound direction indicated by the television picture. Obviously the proper sound direction cannot always be determined from the television picture. However, in a substantial proportion of cases the proper apparent sound direction can readily be determined and since the primary object is to produce the desired illusion or psychological effect upon the viewer, only sufficient accuracy to produce this effect is necessary. It has been found that where apparent movement of the sound source is provided which generally corresponds to that indicated by the picture being viewed, the viewer's imagination supplies a substantial portion of the psychological effect and it is quite unnecessary that the magnitude and direction of the apparent sound source movement be scientifically accurate.

Various qualities of the picture being received may be utilized to control the apparent sound direction in the television sound system. One simple and effective quality of the picture which may be utilized is the brightness of the picture, and the sound system may be arranged to adjust the apparent sound direction to conform to the position of bright objects on the television screen. Alternatively, the sound system may be arranged to adjust the apparent sound direction to conform with dark objects on the screen or in a slightly more complicated form can be arranged to respond to bright objects when the screen is predominantly dark and to respond to dark objects when the screen is predominantly light.

Rather than responding to the relative brightness of the various portions of the screen the simulated binaural sound system may be arranged to respond to either vertical or horizontal movement. Response to movement can also be included in the brightness responsive arrangement explained above. That is, the sound system may be arranged to respond to the relative brightness and darkness of the various portions of the screen but in such a fashion that fluctuations or changes in the brightness produce a greater effect than that produced by a static condition.

Other characteristics of the picture being received could also be utilized alone or in combination to control the apparent sound direction. For example, the detail in the picture, which is represented by high frequency components in the video signal, could be used to control the sound system. The particular characteristics of the picture which is used as control characteristics is largely a matter of choice and depends upon the effect desired to be produced and the particular types of action or program which it is desired be simulated most effectively.

The above and other objects, advantages and features of the invention will be apparent from a consideration of the following description in conjunction with the appended drawings, in which.

Figure 1A:
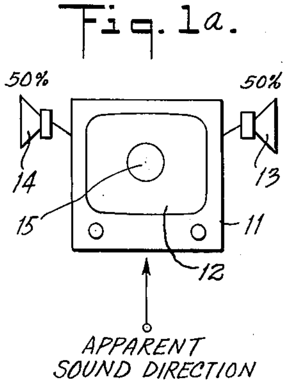
FIGS. 1A–1C are schematic representations of a television receiver having a sound system according to the present invention presented for the purpose of illustrating one mode of operation of the invention.
Figure 1B:
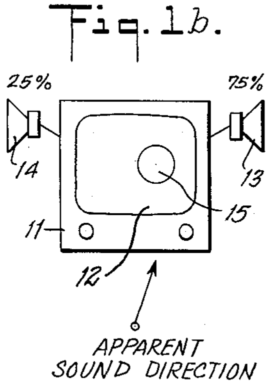
Figure 1C:
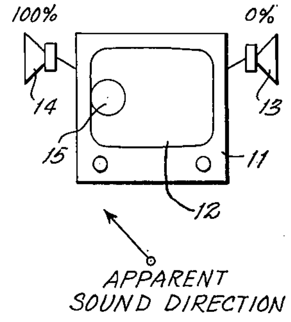

In FIGS. 1A–1C there is shown a television receiver 11 having a screen 12 and supplied with loud speakers 13 and 14 on the right and lefthand sides of the receiver respectively. An object 15 is shown on the screen 12 which will be assumed for the present to be a light object. In FIG. 1A the sound output of the loud speakers 13 and 14 is indicated at 50% each. To a viewer the apparent source of sound under such conditions would be at the center of the screen corresponding with the position of the object 15 in FIG. 1A.

In FIG. 1B the object 15 is displaced by about one-quarter of the screen width toward the right side of the screen. Under such conditions a binaural sound system according to the present invention will operate to cause the volume of the output of loud speaker 13 to be increased to approximately 75% and that of the loud speaker 14 to be decreased to approximately 25%. The percentage figures are referred to the total sound output from the television receiver. Under the conditions shown in FIG. 1B the apparent sound direction to a viewer would be the right center portion of the television screen.

In FIG. 1C the object 15 is displaced to the extreme left portion of the television screen 12. Under these conditions the simulated binaural sound system would direct substantially all of the sound signal to the lefthand loud speaker 14 so that approximately 100% of the sound was produced by this speaker and 0% or no sound was produced by loud speaker 13. Obviously in such a case the apparent sound direction would be in the direction of loud speaker 14, thus corresponding to the position of the object 15 on the screen 12.

The loud speakers 13 and 14 have been indicated schematically in FIGS. 1A–1C. However, it should be noted that in actual practice the binaural speakers may be placed in the right and left portions of the television receiver, either in the front of the receiver or in the sides of the receiver. Alternatively one or both of the loud speakers could be placed in a separate cabinet connected by an electrical cable to the television receiver. By using separate cabinets greater separation of the two speakers could be achieved to increase the degree of binaural effect if desired.

Figure 2:
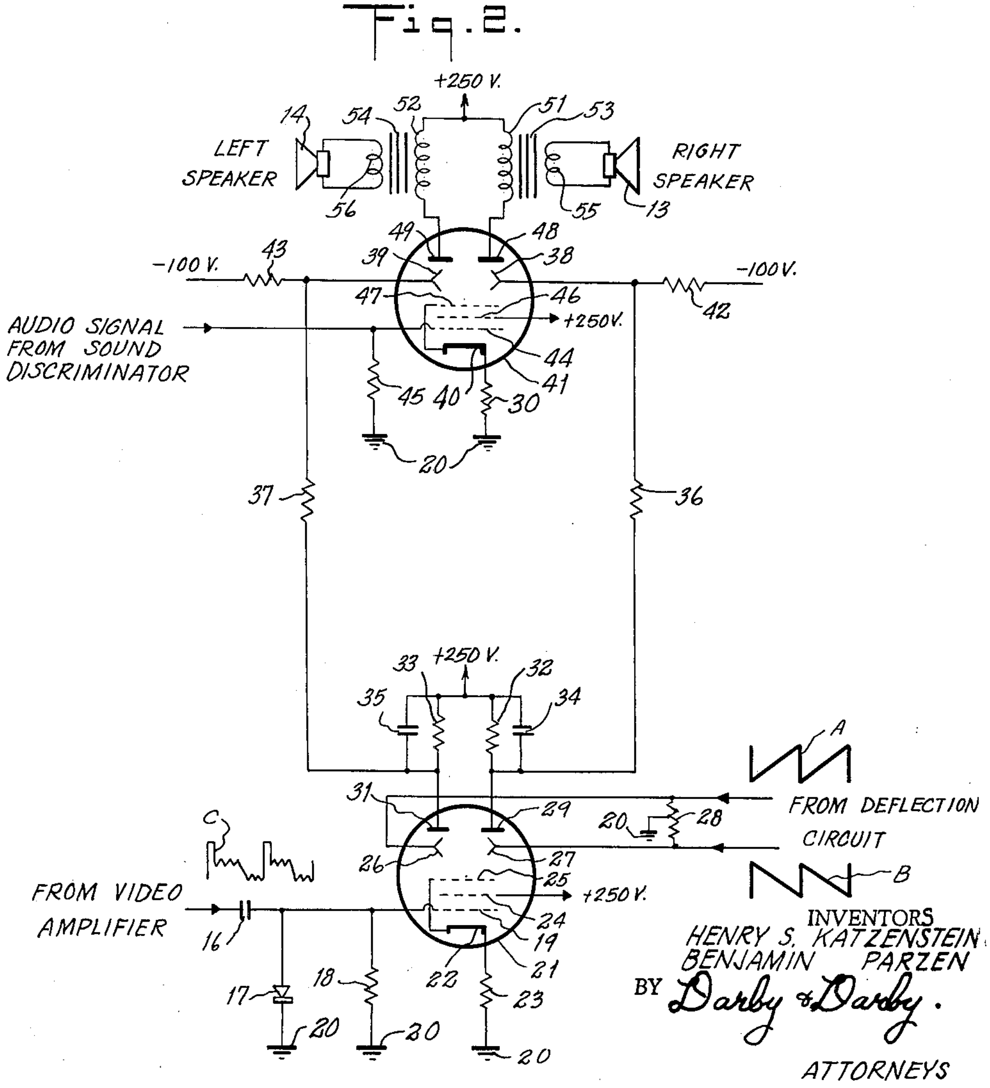
FIG. 2 is a schematic circuit diagram of a simulated binaural sound control system for a television receiver in accordance with the present invention.

An electrical circuit is shown in FIG. 2 for directing the sound signal to two separated loud speakers in response to the characteristics of the television picture as illustrated in FIGS. 1A–1C. It should be understood that the circuit of FIG. 2 would be incorporated in a conventional television receiver and that the various portions of the receiver would function in a conventional manner except that the loud speakers 13 and 14 would be substituted for the conventional single loud speaker, and in some cases one or more stages of audio amplification might be replaced by an amplifier incorporated in the circuit of FIG. 2.

In FIG. 2 the video signal from the video amplifier of the television receiver is fed through a conventional coupling circuit consisting of a capacitor 16, a diode 17 and a grid resistor 18 and to the control grid 19 of a beam deflection tube 21. The beam deflection tube 21 operates as a phase detector in the present invention and it should be understood that other circuits utilizing conventional triodes, pentodes or other electrical control devices could be substituted to perform this function. The beam deflection tube 21 is shown for the purpose of illustration due to the fact that it provides a simple and inexpensive circuit to perform the desired function. A suitable tube for use in the circuit of FIG. 2, is the 6AR8 electron tube.

The beam deflection tube 21 is provided with a cathode 22 which is connected through a cathode resistor 23 to a common ground terminal 20. The second grid 24 of the tube 21 is connected to a positive voltage source of approximately 250 volts. The third grid 25 of the tube 21 is connected to the cathode 22.

The beam deflection tube 21 is provided with deflection plates 26 and 27 which serve to control the proportion of the electron beam from cathode 22 which strikes each of the anodes 29 and 31.

The deflection plates 26 and 27 are connected together by a resistor 28 having a center tap connected to the common ground 20. A signal from the horizontal deflection circuit of the television receiver is impressed across the resistor 28 and is accordingly applied in opposite phase to the deflection plates 26 and 27. The anodes 29 and 31 are connected respectively through resistors 32 and 33 to a source of positive potential of approximately 250 volts. The resistors 32 and 33 are shunted by respective capacitors 34 and 35.

The waveforms applied to the deflection plates 26 and 27 are shown at A and B respectively. A representative video signal is illustrated at C. It will be noted that the waveform C includes two rectangular pulses which are the horizontal sync pulses. Between the sync pulses, it will be noted that the video signal has a higher value on the lefthand side than on the righthand side. This indicates, for the purpose of illustration, a single horizontal scan line.

When the video signal illustrated by the waveform C is applied to the control grid of the tube 21 and the waveforms A and B from the deflection circuit are applied to the deflection plates 26 and 27, the portion of the video signal corresponding to one side of the picture is directed primarily to the lefthand anode 31 while that corresponding to the other side of the picture is directed primarily to the righthand anode 29. Any difference in the brightness of the left and right sides of the picture being received will therefore be indicated by a difference in current through the respective anodes 31 and 29.

This phase detection process takes place for each scan line of the picture. However the relative brightness of the left and righthand sides of the picture will often vary from scan line to scan line or from top to bottom of the picture. It is not desirable that this variation of relative brightness within a single frame of the picture be detected, since this would result in a fluctuation of apparent sound direction at a frequency greater than the television frame rate of 30 cycles per second. This would obviously be objectionable. Bypass capacitors 34 and 35 are accordingly provided of such a capacitance value that together with resistors 32 and 33 they form a network serving to by-pass fluctuations having a frequency approximately equal to or higher than the television frame rate frequency. In other words, the capacitors 34 and 35 have a smoothing or averaging effect so that the voltages at the anodes 29 and 31 are an average of the brightness of the left and right sides of the picture over a period of several frames.

The anodes 29 and 31 are coupled respectively through resistors 36 and 37 to the deflection plates 38 and 39 of a second beam deflection tube 41. The deflection plates 38 and 39 are also connected respectively through resistors 42 and 43 to a source of negative potential of approximately 100 volts.

The first grid or control grid 44 of the beam deflection tube 41 is connected to receive the audio signal from the television sound discriminator. A resistor 45 is connected between the control grid 44 and a common ground terminal 20. Second and third grids 46 and 47 are provided in the beam deflection tube 41 and are connected in a manner similar to corresponding elements of the previously described beam deflection tube 21.

The cathode 40 of the second beam deflection tube 41 is connected through the cathode resistor 30 to a common ground terminal 20. The anodes 48 and 49 of the tube 41 are connected respectively through primary coils 51 and 52 of transformers 53 and 54 to a source of positive potential of approximately 250 volts. Transformers 53 and 54 are provided with secondary windings 55 and 56 which are connected respectively to righthand speaker 13 and lefthand speaker 14.

The circuit associated with beam deflection tube 41 operates in the following manner. The audio signal supplied to the grid 44 controls the magnitude of the current flowing through the beam deflection tube 41 in accordance with the fluctuations of the audio signal. This current is divided between anodes 48 and 49 in accordance with the voltages impressed upon deflection plates 38 and 39. If the voltages on the deflection plates 38 and 39 are equal, the audio signal current will be divided equally between anodes 48 and 49 and the output from the righthand and lefthand speakers 13 and 14 will be equal. This condition will obtain when the voltages at the anodes 29 and 31 of the phase detector beam deflection tube 21 are equal. As previously explained this occurs when the brightness levels of the two sides of the picture being received are equal.

If, for example, the left side of the picture is brighter than the right, the voltage at anode 31 will be higher than at anode 29. The electron beam in tube 41 will therefore be deflected by deflection plates 39 and 38 toward the anode 49. The audio signal current in transformer primary 52 will therefore be higher than that in transformer primary 51 and thus the major portion of the audio signal will be directed to lefthand speaker 14.

The beam deflection tube 41 thus operates as a control circuit to control the relative proportion of the audio signal which is directed to the right-hand and lefthand speakers 13 and 14. A 6AR8 electron tube is also suitable for use as control tube 41. Obviously many other electrical circuits using one or more conventional triodes, pentodes or other electron devices could be substituted for the beam deflection tube 41.

The degree to which the brightness of the respective sides of the television picture control the amount of audio signal fed to the respective speakers could be made adjustable by means of a variable resistor or potentiometer placed in the circuit in conventional manner. For example, a potentiometer could be used to control the amplitude of the deflection voltage supplied to the deflection plates 26 and 27.

The circuit of FIG. 2 is adapted to respond to white objects in the picture being received. Obviously the circuit could be arranged to respond to dark objects simply by reversing appropriate connections, such as the connections to deflection plates 38 and 39.

Although the circuit of FIG. 2 provides a satisfactory illusion in most cases, it may be desirable to provide a circuit which automatically adjusts to provide a sound direction selectively responsive to dark or light areas of the picture being received depending upon the overall brightness of the picture.

Figure 3:
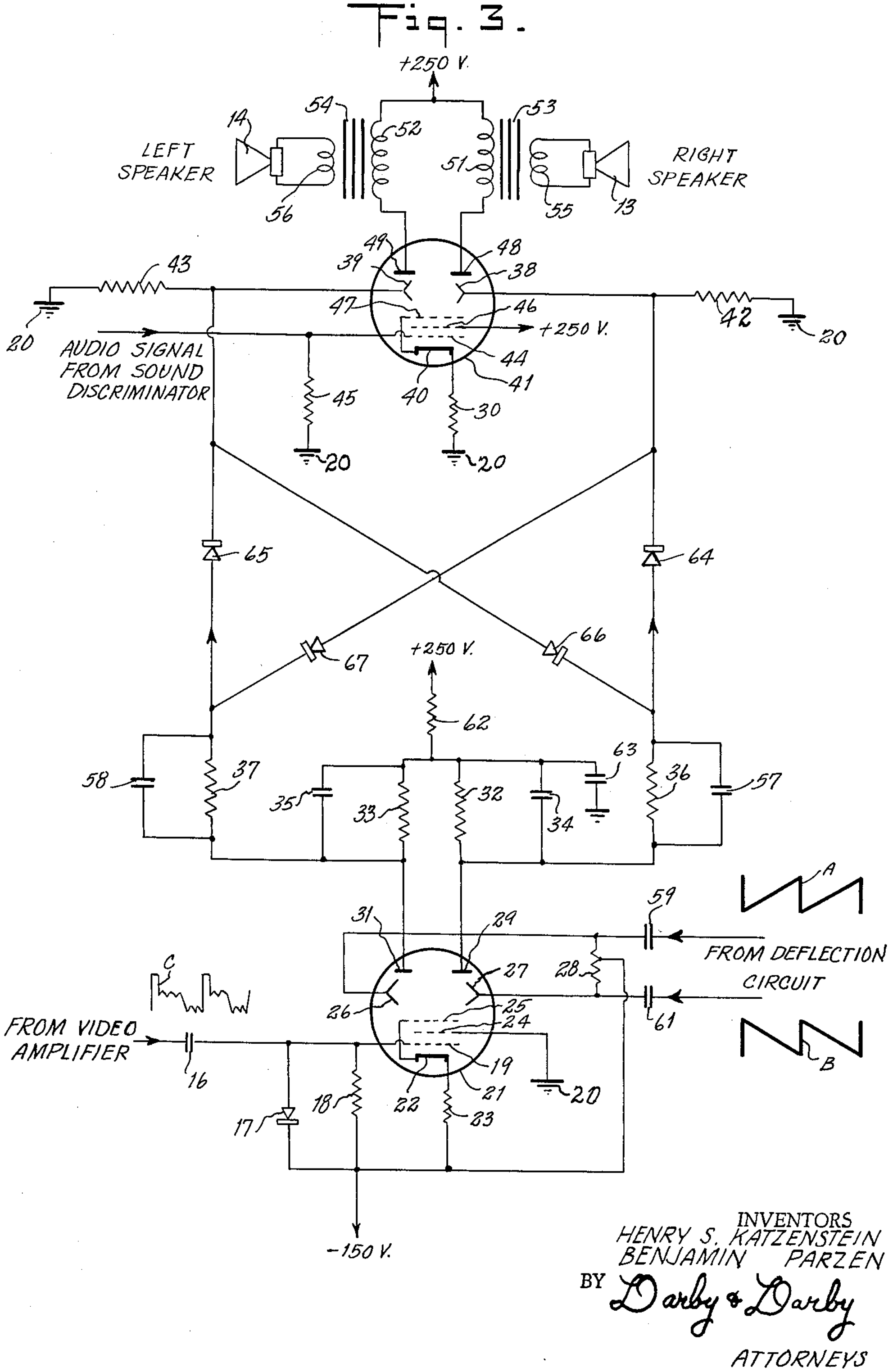
FIG. 3 is a schematic circuit diagram of an alternative embodiment of a simulated binaural sound control system for a television receiver.

FIG. 3 accordingly shows a control circuit similar to that of FIG. 2 but modified to adjust automatically for either light objects on a dark background or dark objects on a light background. The electrical connections for the elements of the phase detector beam deflection tube 21 are generally similar in FIG. 3 to those in FIG. 2, except that the voltages supplied to the tube 21 in FIG. 3 are more negative. Notably diode 17, resistors 18 and 23, and the center tap of resistor 28 are connected to a source of negative potential of approximately 150 volts rather than to ground as shown in FIG. 2. The second grid 24 is connected to ground in FIG. 3 rather than to the positive potential source of 250 volts as shown in FIG. 2. In the anode circuit of the tube 21 in FIG. 3, a resistor 62 is connected in series in the anode circuit and a capacitor 63 is connected between the junction of resistors 62, 33 and 32 and ground.

The operation of the tube 21 in FIG. 3 is generally similar to the operation of this tube in the circuit of FIG. 2 except that, in addition to the votlage variation at the anodes 31 and 29 depending upon the individual current values through each anode and thus upon the relative brightness of the two sides of the television picture, there is also a voltage variation occasioned by the voltage drop across the resistor 62 which is responsive to the total current through both anodes and thus is responsive to the overall brightness or darkness of the picture carried by the video signal.

The capacitor 63 suppresses variations in the voltage drop across the resistor 62 at frequencies equal to or higher than the frame rate, and thus capacitor 63 performs a function similar to that of capacitors 34 and 35 previously explained.

It will be further noted that the potential at anodes 31 and 29 fluctuates about zero or ground potential and preferably the resistance values in the circuit are adjusted so that a picture of medium brightness produces a zero potential at anodes 29 and 31.

In the circuit of FIG. 3 resistors 42 and 43 are connected between deflection plates 38 and 39 and ground terminals 20 whereas in the previous circuit they were connected to a source of negative potential. Thus in FIG. 3 the potential at the anodes 29 and 31 will generally be more positive than the potential at deflection plates 38 and 39 for dark pictures, and will normally be lower than that of the deflection plates 38 and 39 for bright pictures.

Diodes 64 and 65 have been placed in series in the leads to deflection plates 38 and 39 respectively of the control tube 41, and diodes 66 and 67 have been added providing connections in the opposite sense from anodes 29 and 31 to deflection plates 39 and 38. Diodes 64 and 65 are conductive when the potential at anodes 29 and 31 is positive. Diodes 66 and 67 are oriented in opposite fashion to diodes 64 and 65 and thus are conductive when the potential at anodes 29 and 31 is negative.

It will therefore be seen that when the overall brightness of the picture carried by the video signal is low, the potential at anodes 29 and 31 in FIG. 3 will be negative and the circuit of FIG. 3 will operate substantially in the same fashion as that described for FIG. 2. However when the potential at anodes 29 and 31 becomes positive, as will be the case when the brightness of the picture is high, the connections to deflection plates 38 and 39 will effectively be reversed so that the apparent sound direction will be controlled by the darker side of the picture.

Television broadcasting practice is such that, when the primary object of interest on the screen is of light color and thus has a high inherent brightness, the background is controlled by lighting or otherwise to produce a low overall picture brightness thus causing the object of primary interest to stand out and to provide a clear picture. On the other hand when the object of primary interest is of dark color and has an inherent low brightness in the television picture, such as would be the case with a singer in a black costume for example, the background is normally caused by control of lighting or otherwise to have a high overall brightness. It is this customary television practice upon which the circuit of FIG. 3 depends to provide a high correlation between the apparent sound direction in a simulated binaural sound system and the indicated sound source in the television picture.

Obviously it is impossible to provide perfect correlation with a simulated system even with apparatus of much greater complexity than that utilized in the present invention. In most such cases the binaural sound system will tend to be virtually inoperative and will provide the same general sound effect as a monaural system. In rare cases where highly uncorrelated binaural effects were produced and were objectionable the binaural sound system could be disabled, for example, by reducing the signal from the television deflection circuit to zero.

An additional feature is included in the circuit of FIG. 3 which has been found to produce a desirable accentuation of the binaural effect. This effect is produced by capacitors 57 and 58 connected in parallel with resistors 36 and 37 respectively. Capacitors 57 and 58 cause the voltages applied to deflection plates 38 and 39 to vary as a function of the time differential of the potentials at anodes 29 and 31. In other words, the capacitors 57 and 58 cause sudden changes in relative brightness on the left or righthand side of the screen to produce a greater effect in the binaural sound system than the effect produced by gradual changes or by static conditions.

In general, sound sources in the television picture are moving or fluctuating in brightness and thus it is desirable that the binaural sound system be more highly responsive to fluctuating brightness values. As an example of a situation where this effect is desirable consider a scene in which a gun is fired producing a flash on the television screen. In such a situation the sudden flash of light on the screen although it be insufficient to shift the overall brightness of one side of the screen from dark to light will be accentuated by the effect of capacitors 57 and 58 and thus will cause the apparent sound direction to be shifted in the direction of the flash to produce a realistic simulated binaural effect.

It should be pointed out that the capacitors 57 and 58 in FIG. 3 providing a higher response for fluctuating brightness values may also be incorporated in the circuit of FIG. 2.

Although an all electronic system has been described and shown in FIGS. 2 and 3, it is obvious that two or more photoelectric cells focused on respective portions of the television screen from inside the television set might be utilized to sense the brightness values of respective portions of the screen rather than electronic apparatus of FIGS. 2 and 3. Such photocells could readily be supplied with known apparatus for detecting or accentuating moving objects to render the system responsive to movement.

It should also be noted that although in the preferred embodiment of the invention the left and righthand portions of the screen are compared, the upper and lower portions of a television screen could also be compared to provide variations in the sound reproduction. It is thought however, that the simulated binaural system described is most effective since this is an effect which cannot be produced solely by means of equipment at the television broadcast studio.

The present invention is adapted to produce a simulated binaural effect without any conscious effort on the part of the broadcasting station personnel. However, it will be noted that the system described and shown is particularly responsive to brightness values occurring in the portion of the television signal corresponding to the extreme right and left sides of the picture. These portions of the picture are normally not visible on the television receiver due to the fact that the picture is customarily adjusted to over-scan the edges of the face of the picture tube. In any event, substantially all picture tubes in use at the present time are rounded at the corners so that the corners of the picture as transmitted are not seen on the television screen.

It would therefore be quite simple for the broadcast station to control the operation of simulated binaural sound systems in television receivers receiving the broadcast simply by placing a strip of high brightness on one or the other of the sides of the transmitted television picture. The control could further be increased by placing a black strip on the opposite side of the picture. This could be accomplished either physically by an attachment to the television camera or electrically by well known special effect circuits. If continuous strips along the vertical edges of the picture were considered to be objectionable, control areas could be limited to the corners of the transmitted picture which in virtually all cases are not visible on the television receiver screen.

Thus it will be seen that while the system shown and described is quite effective without any control by the broadcasting station it is also readily adapted to be controlled by the broadcasting station without the necessity of utilizing additional frequency bandwidth other than that already available.

Although various embodiments of the present invention have been explained and suggested, many other variations and modifications to the present invention might be devised by a person of ordinary skill in the art. Accordingly the present invention is not to be construed to be limited to the particular embodiments shown and suggested but is to be limited solely by the appended claims.

What is claimed is:

1. In a television receiver a sound system comprising at least two sound sources responsive to the audio portion of a television signal and means for modifying the characteristics of the sound signal produced by at least one of said sources in response to the relative brightness of two different portions of the picture carried by the demodulated television video signal being received.

2. In a television receiver a sound system comprising at least two sound sources responsive to the audio portion of a television signal and means for modifying the characteristics of the sound signal produced by at least one of said sources in response to the relative brightness of respective halves of the picture carried by the demodulated television video signal being received.

3. In a television receiver a sound system comprising at least two sound sources responsive to the audio portion of a television signal and means for modifying the characteristics of the sound signal produced by at least one of said sources in response to the relative brightness of the left and right halves of the picture carried by the demodulated television video signal being received.

4. In a television receiver having a single video and a single audio channel, a sound system comprising a sound source with a variable apparent sound direction, and means for controlling said source to produce an apparent sound direction corresponding to a portion of the picture carried by the television signal being received on the video channel, said portion being the portion of the picture having a high brightness value when the overall brightness value of the picture is low and being the portion of the picture having a low brightness value when the overall brightness value of the picture is high.

5. In a television receiver a sound system comprising two loud speakers, means for supplying an audio signal to said loud speakers corresponding to the audio portion of a television signal and means for controlling the relative amount of said audio signal conveyed to each of said speakers in response to the brightness of a portion of the picture carried by the demodulated television video signal being received.

6. In a television receiver having means for deriving an audio signal, a video signal and a horizontal sweep synchronizing signal, a sound system comprising means for deriving a control signal representative of the phase of a time integrated version of said video signal relative to said horizontal sweep synchronizing signal and means for controlling, in response to said control signal, the relative magnitude of said audio signal supplied to each of two spaced sound sources.

7. A sound system as claimed in claim 6 further including means for accentuating the effect of sudden changes in said control signal upon the last said means.

8. A sound system as claimed in claim 6 further including means for reversing the sense of the response of the last said means in response to changes in the overall brightness value of the picture carried by said video signal.

9. The method of locally producing a sound effect in a television receiver sound system comprising the steps of sensing the relative value of predetermined characteristics of different portions of the picture carried by a television signal being received and controlling a sound source in response to said relative values.

10. The method of producing a simulated binaural effect in a television receiver sound system comprising the steps of sensing the relative brightness values of respective portions of the picture carried by a television signal being received and controlling the apparent sound direction of a sound source having a variable apparent sound direction in response to said brightness values.

11. In a television receiver having a single video channel and a single audio channel, means for deriving an audio signal from said audio channel and a video signal from said video channel, said receiver having a horizontal sweep signal, a simulated binaural sound system comprising a first beam deflection electron tube having a control grid, plural anodes, and plural deflection plates, means for supplying the demodulated video signal to the control grid of the said first beam deflection tube, means for supplying the horizontal sweep signal to the deflection plates of said beam deflection tube, a second beam deflection tube having a control grid, plural anodes, and plural deflection plates, means for supplying the demodulated audio signal to the control grid of said second beam deflection tube, two spaced sound sources, and means for supplying the output signal from respective anodes of said second deflection tube to respective ones of said sound sources whereby said sound sources receive a percentage of the total demodulated audio signal in accordance with a characteristic of the demodulated video signal supplied to the deflection plates of said first beam deflection tube.

12. In a television receiver having means for receiving radio frequency signals carrying visual and audio information and means for producing video signals and means for producing audio signals both responsive to said radio frequency signals, said means for producing audio frequency signals being responsive to an audio-frequency-modulated carrier within a television channel frequency range, a directional sound system comprising at least two sound sources, each responsive to said means for producing audio signals, a sound directionality control means responsive to a portion of said radio frequency signal other than said audio-frequency-modulated carrier, and means for differently modifying the signals supplied to the respectively sound sources in response to said directionality control means.

13. In a television receiver having means for receiving radio frequency signals carrying visual and audio information and means for producing video signals and means for producing audio signals both responsive to said radio frequency signals, said means for producing audio frequency signals being responsive to an audio-frequency-modulated carrier within a television channel frequency range, a directional sound system comprising at least two sound sources, each responsive to said means for producing audio signals, a sound directionality control means responsive to a portion of said radio frequency signal other than said audio-frequency-modulated carrier, and means for differently modifying the signals supplied to the respective sound sources in response to said directionality control means, said sound sources being supplied with substantially equal signals from said means for producing audio frequency signals in the absence of modification by said directionality control means.

14. The method of producing a binaural effect in a television receiver sound system comprising the steps of sensing a predetermined characteristic of the signal received by said receiver, which characteristic does not normally affect the characteristics of the sound output of said receiver, and causing the apparent directionality of the sound produced by said receiver to vary in accordance with said sensed characteristic.

References Cited in the file of this patent

UNITED STATES PATENTS

| | | |
|---|---|---|
| 2,036,350 | Montani | Apr. 7, 1936 |
| 2,146,876 | Zworykin | Feb. 14, 1939 |
| 2,477,679 | Young | Aug. 2, 1949 |
| 2,538,869 | Holst | Jan. 23, 1951 |
| 2,566,700 | Goldsmith | Sept. 4, 1951 |
| 2,578,298 | Goldsmith | Dec. 11, 1951 |
| 2,714,633 | Fine | Aug. 2, 1955 |
| 2,773,119 | Parker | Dec. 4, 1956 |
| 2,822,429 | Watson | Feb. 4, 1958 |

UNITED STATES PATENT OFFICE

CERTIFICATE OF CORRECTION

Patent No. 3,056,854

October 2, 1962

Henry S. Katzenstein et al.

It is hereby certified that error appears in the above numbered patent requiring correction and that the said Letters Patent should read as corrected below.

Column 10, line 2, for "respectively" read -- respective --.

Signed and sealed this 23rd day of April 1963.

(SEAL)
Attest:

ERNEST W. SWIDER
Attesting Officer

DAVID L. LADD
Commissioner of Patents